(12) United States Patent
Schmid et al.

(10) Patent No.: US 11,020,701 B2
(45) Date of Patent: Jun. 1, 2021

(54) FILTER ELEMENT HAVING OPTIMIZED FLOW CONTROL

(71) Applicant: MANN+HUMMEL GmbH, Ludwigsburg (DE)

(72) Inventors: Daniel Schmid, Sachsenheim (DE); Timo Dirnberger, Marbach (DE); Andreas Weber, Freiberg (DE); Markus Schmidl, Pilsting (DE); Christoph Goldbrunner, Dingolfing (DE); Markus Hanselmann, Lauffen (DE); Guenter Goerg, Moeglingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/524,248

(22) Filed: Jul. 29, 2019

(65) Prior Publication Data

US 2019/0351361 A1    Nov. 21, 2019

Related U.S. Application Data

(63) Continuation of application No. PCT/EP2017/080710, filed on Nov. 28, 2017.

(30) Foreign Application Priority Data

Jan. 30, 2017   (DE) .......................... 102017000792.6

(51) Int. Cl.
*B01D 46/10* (2006.01)
*B01D 46/30* (2006.01)
(Continued)

(52) U.S. Cl.
CPC ....... *B01D 46/521* (2013.01); *B01D 46/0001* (2013.01); *B01D 46/0039* (2013.01); *B01D 46/10* (2013.01); *B01D 2275/206* (2013.01)

(58) Field of Classification Search
CPC .... B01D 46/0002; B01D 46/10; B01D 46/30; B01D 46/241; B01D 46/521; B01D 46/523; B01D 29/031; B01D 53/0415
(Continued)

(56) References Cited

U.S. PATENT DOCUMENTS

| 4,655,921 A | 4/1987 | Fujimoto |
| 5,043,000 A | 8/1991 | Kadoya |

(Continued)

FOREIGN PATENT DOCUMENTS

| DE | 19654188 A1 | 7/1997 |
| DE | 102004025274 A1 | 12/2004 |

(Continued)

*Primary Examiner* — Minh Chau T Pham
(74) *Attorney, Agent, or Firm* — James Hasselbeck

(57) ABSTRACT

A filter element for an air filter has a filter bellows with a filter medium folded multiple times. A recess is disposed in the filter bellows and is designed to receive a guiding rib of the air filter. The recess is curved at least in sections thereof along a length extension of the recess. The air filter has a housing and a guiding rib, wherein the filter element is arranged at least partially in the housing and the guiding rib is immersed at least partially in the recess of the filter element. In a method for producing the filter element, the recess in the filter bellows is formed with a computer-assisted separation method that forms the recess to be curved at least in sections thereof.

10 Claims, 10 Drawing Sheets

(51) Int. Cl.
  *B01D 46/52* (2006.01)
  *B01D 46/00* (2006.01)
(58) Field of Classification Search
  USPC ...... 55/495, 497, 498, 502, 521, 529, 385.3;
  123/198 E
  See application file for complete search history.

(56) References Cited

U.S. PATENT DOCUMENTS

| | | | | |
|---|---|---|---|---|
| 5,531,892 | A * | 7/1996 | Duffy | B01D 46/0005 |
| | | | | 210/493.1 |
| 5,716,521 | A * | 2/1998 | Whiteley | B01D 46/30 |
| | | | | 210/266 |
| 5,902,364 | A | 5/1999 | Tokar et al. | |
| 6,312,489 | B1 | 11/2001 | Ernst et al. | |
| 6,740,136 | B2 * | 5/2004 | Duffy | B01D 29/031 |
| | | | | 55/497 |
| 6,955,696 | B1 | 10/2005 | Ost et al. | |
| 7,004,989 | B2 * | 2/2006 | Karlsson | B01D 46/10 |
| | | | | 55/497 |
| 7,070,641 | B1 * | 7/2006 | Gunderson | B01D 53/0415 |
| | | | | 55/497 |
| 7,135,052 | B2 * | 11/2006 | Meierhoefer | B01D 46/0002 |
| | | | | 55/495 |
| 7,257,942 | B2 | 8/2007 | Schmeichel et al. | |
| 7,892,333 | B2 * | 2/2011 | Elliot | B01D 46/521 |
| | | | | 96/222 |
| 7,969,700 | B2 * | 6/2011 | Coloma Calahorra | |
| | | | | H01L 31/044 |
| | | | | 361/84 |
| 7,976,606 | B1 | 7/2011 | Nicholson | |
| 8,062,404 | B2 * | 11/2011 | Volkmer | B01D 46/10 |
| | | | | 55/497 |
| 8,163,050 | B2 * | 4/2012 | Belyew | B01D 46/523 |
| | | | | 55/306 |
| 8,518,139 | B2 * | 8/2013 | Jessberger | B01D 46/2411 |
| | | | | 55/495 |
| 8,562,708 | B2 * | 10/2013 | Platt | B29C 48/914 |
| | | | | 55/497 |
| 8,709,139 | B2 * | 4/2014 | Veeser | B32B 5/26 |
| | | | | 96/66 |
| 10,569,209 | B2 * | 2/2020 | Breitfuss | B01D 46/521 |
| 2003/0024872 | A1 | 2/2003 | Muzik et al. | |
| 2005/0144916 | A1 | 7/2005 | Adamek | |
| 2006/0021932 | A1 | 2/2006 | Darnell | |
| 2007/0157589 | A1 | 7/2007 | Haberkamp et al. | |
| 2009/0064647 | A1 | 3/2009 | Darnell | |
| 2010/0011531 | A1 | 1/2010 | Liddell et al. | |
| 2011/0023427 | A1 | 2/2011 | Srinivasan et al. | |
| 2011/0252759 | A1 | 10/2011 | Nicholas | |
| 2012/0324851 | A1 | 12/2012 | Haefner | |
| 2014/0053521 | A1 | 2/2014 | Muenkel | |
| 2014/0332624 | A1 * | 11/2014 | DeDe | B64D 33/02 |
| | | | | 244/58 |

FOREIGN PATENT DOCUMENTS

| | | |
|---|---|---|
| DE | 102004005904 A1 | 9/2005 |
| DE | 102006009257 B3 | 7/2007 |
| DE | 102008058356 A1 | 5/2010 |
| DE | 202009000969 U1 | 7/2010 |
| DE | 102014016672 A1 | 5/2015 |
| DE | 102015011660 A1 | 3/2016 |
| DE | 102014224549 A1 | 6/2016 |
| EP | 1214962 | 6/2002 |
| EP | 1681085 A1 | 7/2006 |
| EP | 1757355 A1 | 2/2007 |
| FR | 2855071 A1 | 11/2004 |
| WO | 9847601 A1 | 10/1998 |
| WO | 2005037408 A1 | 4/2005 |
| WO | 2008147585 A2 | 12/2008 |

* cited by examiner

FILTER ELEMENT HAVING OPTIMIZED FLOW CONTROL

CROSS-REFERENCE TO RELATED APPLICATIONS

This application is a continuation application of international application No. PCT/EP2017/080710 having an international filing date of 28 Nov. 2017 and designating the United States, the international application claiming a priority date of 30 Jan. 2017 based on prior filed German patent application No. 10 2017 000 792.6, the entire contents of the aforesaid international application and the aforesaid German patent application being incorporated herein by reference.

BACKGROUND OF THE INVENTION

The invention concerns a filter element with optimized flow control. The invention concerns moreover an air filter with such a filter element and a method for producing such a filter element.

WO 2013/104794 A1 discloses an air filter with a housing and an air filter element. The air filter element comprises an air filter medium in the form of a folded bellows with fold sheets. In this way, an enlargement of the filter surface is effected. Guiding ribs may be arranged in the air filter. The guiding ribs can be arranged adjacent to the fold sheets. In order to optimally utilize the existing installation space, the fold sheets have a different length.

Disadvantageously, the air flow between inlet and outlet is guided along a flow line only through one fold sheet or a few fold sheets, respectively, which has a reducing effect on the filtering action. In installation spaces of low height, the filter element can be used disadvantageously only with a decreased flow control and filtering action. Furthermore, the complex manufacture of fold sheets of different lengths is disadvantageous.

It is therefore object of the invention to provide a compact, constructively simple filter element which enables a good flow control and an improved filtering action. It is moreover object of the invention to provide an air filter with such a filter element. Furthermore, it is the object of the invention to provide a method for producing such a filter element.

SUMMARY OF THE INVENTION

The object is solved by a filter element according to the invention for an air filter, wherein the filter element comprises a filter bellows with a filter medium which is folded multiple times. In the filter bellows, a recess for receiving a first guiding rib of the air filter is arranged. The recess is embodied to be curved, i.e., bent, at least in sections thereof along its length extension.

Advantageously, a guiding rib can be inserted into the recess of the filter bellows in order to guide the air flow in a more controlled manner through the filter medium. Advantageously, the air flow can be oriented substantially perpendicular to the fold sheets in this way. In this way, the air flow can be advantageously guided along the guiding rib through all fold sheets. Due to this flow control, the filtering action can be significantly increased. The improved flow control makes it possible also to save installation space, in particular in cases in which only low installation spaces are available. The recess with a curved extension enables the accommodation of a guiding rib at very minimal air resistance in a constructively very simple way because the length of the fold sheets, i.e., the density of the folded bellows, can be maintained uniform.

The object is further solved by an air filter according to the invention, wherein the air filter comprises a housing and a filter element as set forth above and arranged at least partially in the housing, wherein the air filter comprises a first guiding rib which is immersed at least partially in the recess of the filter element.

The object is further solved by the method according to the invention for producing a filter element as described above, wherein the method comprises the method steps of:

A) providing the filter bellows,
B) forming the recess in the filter bellows with a computer-assisted separation method, wherein the separation method forms the recess to be curved at least in sections thereof.

Advantageous embodiments result from the respective dependent claims.

An advantageous embodiment of the filter element according to the invention is characterized in that the recess is arranged continuously from one side face of the filter element to another side face of the filter element. Advantageously, in this way the air can be guided completely along a guiding rib, which can be arranged in the recess, along the path between inlet and outlet.

An advantageous embodiment of the filter element according to the invention is characterized in that the recess divides the filter medium of the filter bellows completely into two filter medium bodies. In this context, the filter medium bodies are connected to each other. Advantageously, by dividing the filter medium into two filter medium bodies, the recess can be produced in a simple way. Advantageously, the filter medium bodies can be removed together from the air filter when they are connected to each other, for example, for exchanging the filter medium. The connection of the two filter medium bodies can be, for example, realized by polyurethane foam.

An advantageous embodiment of the filter element according to the invention is characterized in that the filter medium bodies are connected by means of at least one sealing strip of the filter element. Advantageously, by means of the sealing strip it can be effected that no unfiltered air can escape between the filter medium bodies.

An advantageous embodiment of the filter element according to the invention is characterized in that the filter element is embodied in a parallelepipedal shape. Advantageously, a parallelepipedal filter medium, due to its shape, can be installed particularly easily in a typical filter housing.

The air filter according to the invention comprises a housing and a filter element according to the invention which is at least partially arranged in the housing. In this context, the air filter comprises a first guiding rib. The first guiding rib is immersed partially or completely in the recess of the filter element. The filter medium is thus arranged along both faces of the first guiding rib. Advantageously, the first guiding rib enables the control of the direction of the air flow between inlet and outlet. Advantageously, the air flow can be guided through all filter sheets by means of the first guiding rib arranged in the recess.

An advantageous embodiment of the air filter according to the invention is characterized in that the housing comprises a second guiding rib which is positioned opposite the first guiding rib and is immersed in the recess. Advantageously, by means of the second guiding rib, which is in particular arranged above the first guiding rib, the control of the air flow is further improved. Due to the second guiding rib, an escape of unfiltered air from the region of the controlled air flow can be prevented better.

In order to embody the air filter to be stable and at the same time of a constructively simple configuration, the first guiding rib and/or the second guiding rib can be embodied as one piece together with a further part of the housing. In particular, the first guiding rib can be embodied as one piece together with a housing bottom and/or the second guiding rib can be embodied as one piece together with the housing cover.

An advantageous embodiment of the air filter according to the invention is characterized in that the second guiding rib is connected with the first guiding rib. In particular, the free end of the first guiding rib is connected with the free end of the second guiding rib. Advantageously, by a connection between the first guiding rib and the second guiding rib, it is prevented that air can escape between the guiding ribs from the region of the controlled air flow. Furthermore, the housing is mechanically stabilized by the guiding ribs which are anchored to each other.

In a method according to the invention for producing a filter element according to the invention, a filter bellows, in particular a parallelepipedal one, is provided in a first method step. In a second method step, the recess in the filter bellows is formed by a computer-assisted (CNC) separation method. In this context, the recess is formed by the separation method so as to be curved, at least in sections thereof. The recess can be formed with a saw. Before, after and/or between the two method steps, a further method step or further method steps can be performed. Advantageously, the recess in the filter bellows can be produced in a simple way by the separation method.

An advantageous embodiment of the method according to the invention is characterized in that the separation method is carried out in the form of a computer-assisted jet/beam cutting method. By means of a computer-assisted jet/beam cutting method, a high precision can be obtained for shaping the filter element according to the invention. The jet/beam cutting method can be in the form of a waterjet cutting method or laser beam cutting method.

BRIEF DESCRIPTION OF THE DRAWINGS

Further features and advantages of the invention result from the following detailed description of several embodiments of the invention, from the claims as well as based on the Figures of the drawing showing details important to the invention. The various features can be realized individually for themselves or several thereof in any combinations in variants of the invention. The features illustrated in the drawing are illustrated such that the particularities of the invention can be made clearly visible.

DESCRIPTION OF PREFERRED EMBODIMENTS

Figure 1:
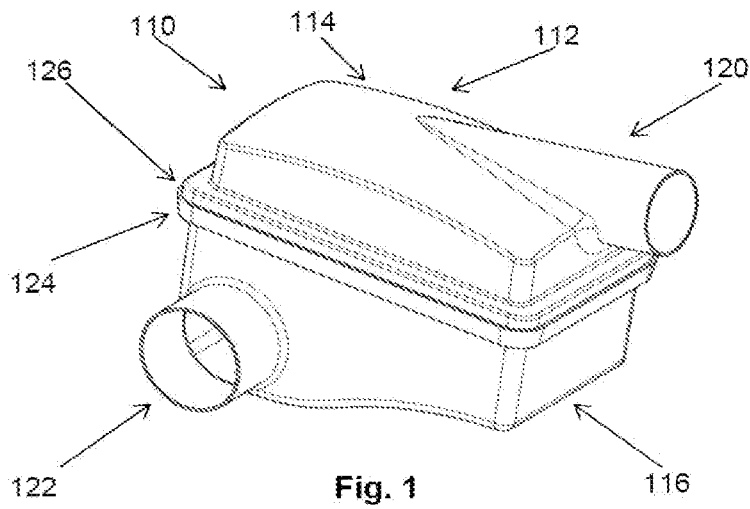
FIG. 1 is an isometric illustration of an air filter according to the invention in a first embodiment.

An air filter 110 according to the invention is isometrically illustrated in FIG. 1. The air filter 110 comprises a housing 112 with a housing cover 114 and a housing bottom 116. An outlet 120 is arranged at the housing cover 114. An inlet 122 into a chamber (not illustrated in the Figure) in the air filter 110 is arranged in a side face of the housing bottom 116. The inlet 122 is arranged at a side wall of the housing bottom 116. At the inlet 122, a valve or an adjustable opening may be arranged. The housing bottom 116 comprises a rim 124 at the top end. The housing cover 114 also comprises a rim 126 at its bottom end. The terms top and bottom are defined in particular in that the housing cover 114 is arranged on the housing bottom 116 and is thus arranged above the housing bottom 116. In this way, in particular also the bottom of the housing bottom 116 is determined as the lower side face of the housing bottom 116.

Figure 2:
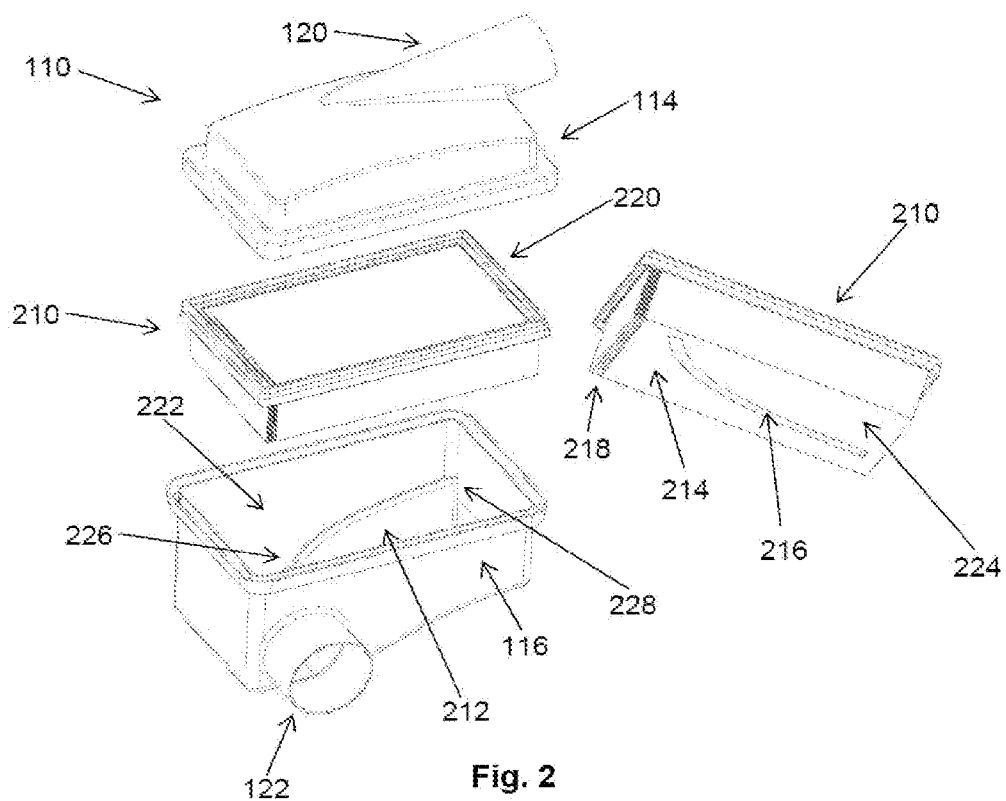
FIG. 2 shows a housing cover of the air filter according to the invention, a filter element according to the invention in two different views, and a housing bottom of the air filter.

FIG. 2 shows separately, respectively, the housing bottom 116, the housing cover 114, and a filter element 210 of the air filter 110 according to the invention. The filter element 210 is of a parallelepipedal shape. A guiding rib 212 is arranged at the bottom on the inner side of the housing bottom 116. It comprises a curvature along a horizontal cross section through the chamber 222. It extends thus in the form of a curve and not in a straight line. A section 226 at one end of the guiding rib 212 is arranged along an extension of the longitudinal axis of the inlet 122. This section 226 is arranged in this context such that the air flow, after entering through the inlet 122, impacts completely or partially on the guiding rib 212 in case of a linear movement.

The other end 228 of the guiding rib 212 is arranged in such a way below and laterally to the outlet 120 that the air flow or the portion of the air flow, which after entry through the inlet 122 impacts on the guiding rib 212, is guided along the guiding rib 212 in the direction toward the outlet 120.

The filter element 210 comprises a filter medium 214. The filter medium 214 comprises a recess 216. A guiding rib 212 can be inserted with form fit into this recess 216 when the filter element 210 is placed on the housing bottom 116. The filter medium 214 is folded multiple times and embodied in the form of a filter bellows 224 with fold sheets 218. The air flow flows through the filter medium 214 while it is guided along the guiding rib 212 from the inlet 122 to the outlet 120.

The filter element 210 comprises also a sealing rim 220.

Figure 3:
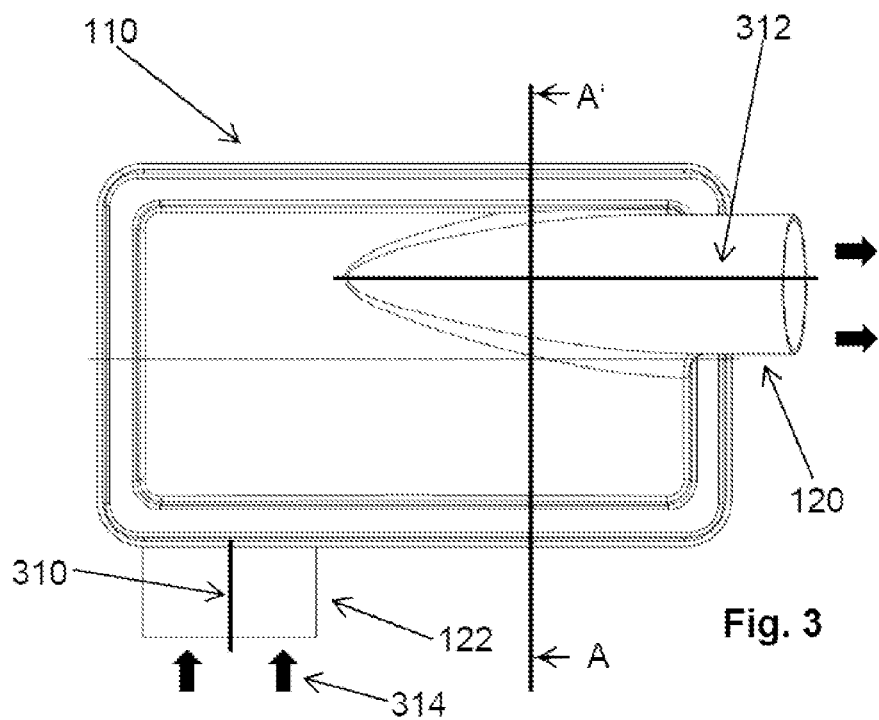
FIG. 3 shows a plan view of the air filter according to the invention.

FIG. 3 shows a plan view of the air filter 110. The inlet 122 comprises a longitudinal axis 310 and the outlet 120 a longitudinal axis 312. The flow 314 of the air into the inlet 120 and out of the outlet 120 is illustrated by thick black arrows.

Figure 4:
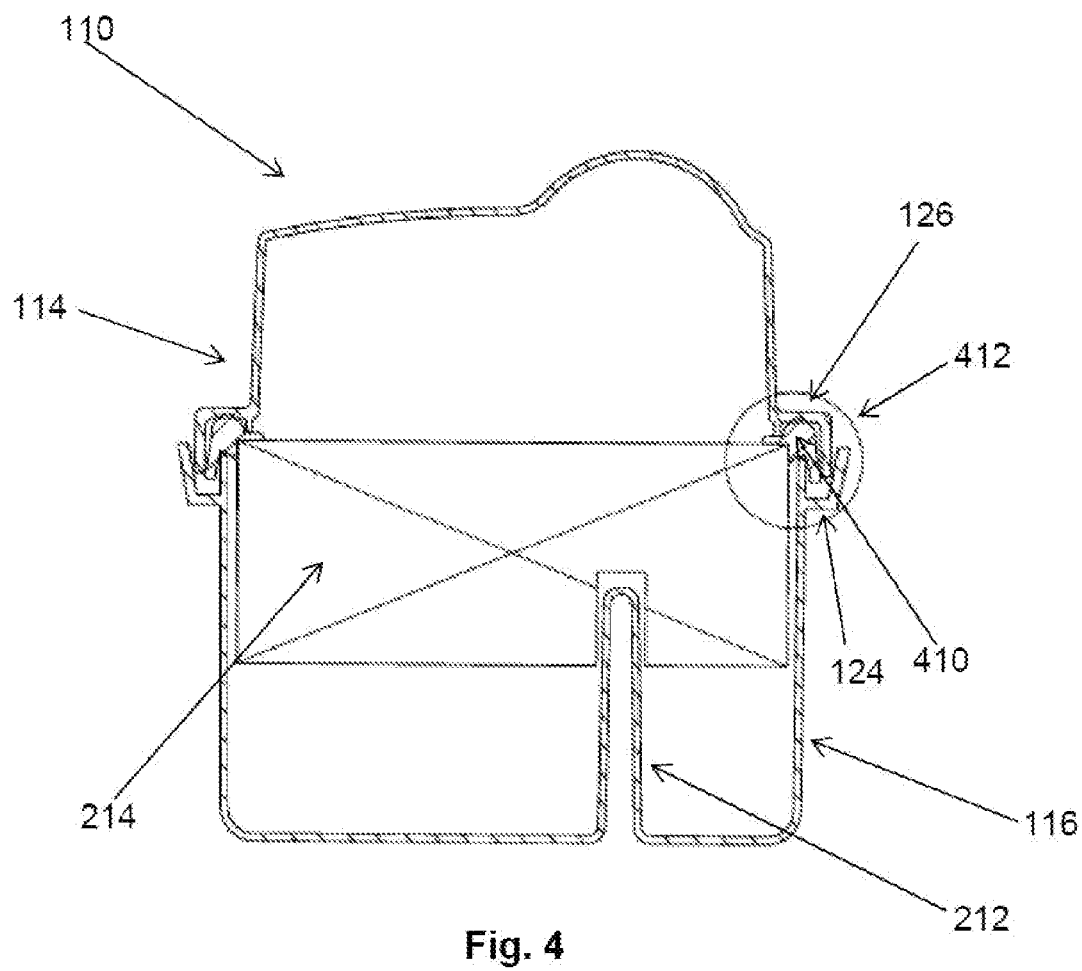
FIG. 4 is a cross section of the air filter according to the invention.

FIG. 4 shows a cross section of the air filter 110 along the line AA=in FIG. 3. The guiding rib 212 is inserted with form fit into the filter medium 214 received into and engaging the recess 216, dividing airflow from the inlet 122 into two adjacent air flow streams. The filter medium 214 is arranged along both faces of and above the guiding rib 212. A sealing rim 410 is arranged at the upper edge of the housing bottom 116. The rim 126 of the housing cover 114 is arranged at the rim 124 of the housing bottom 116 in the contact region 412. As can be seen together with FIG. 2, the air flow or the portion of the air flow, which after entry through the inlet 122 impacts on the guiding rib 212, dividing the air flow into two adjacent air flow streams which are guided along the guiding rib 212 in the direction toward the outlet 120.

Figure 5:
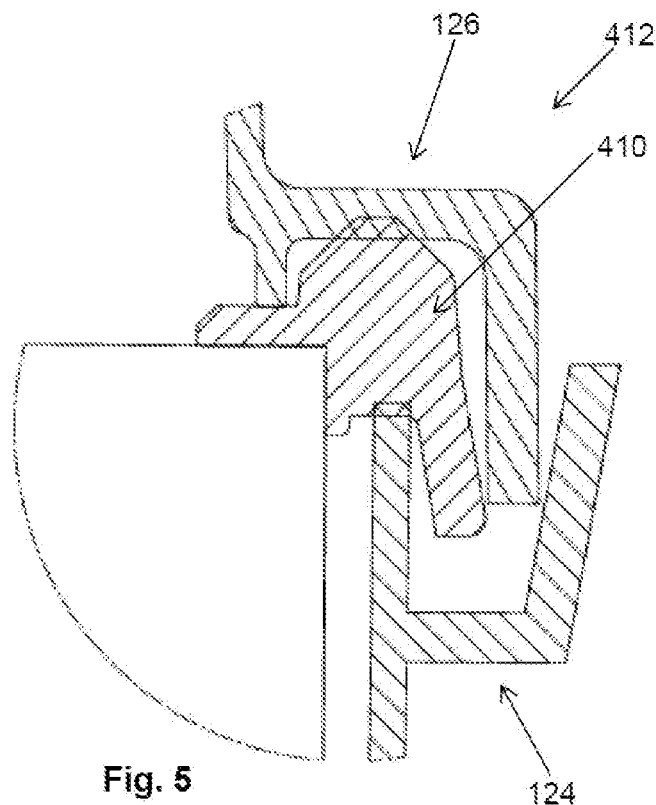
FIG. 5 shows the contact region between housing cover and housing bottom in cross section.

The contact region 412 between the rim 126 of the housing cover 114 (not illustrated) and the rim 124 of the housing bottom 116 (not illustrated) is shown enlarged in FIG. 5. The sealing rim 410 which is arranged at the upper rim of the housing bottom 116 is contacting air-tightly the rim 126 of the housing cover 114 and the rim 124 of the housing bottom 116. Also, the rim 126 of the housing cover 114 and the rim 124 of the housing bottom 116 engage each other seal-tightly.

Figure 6:
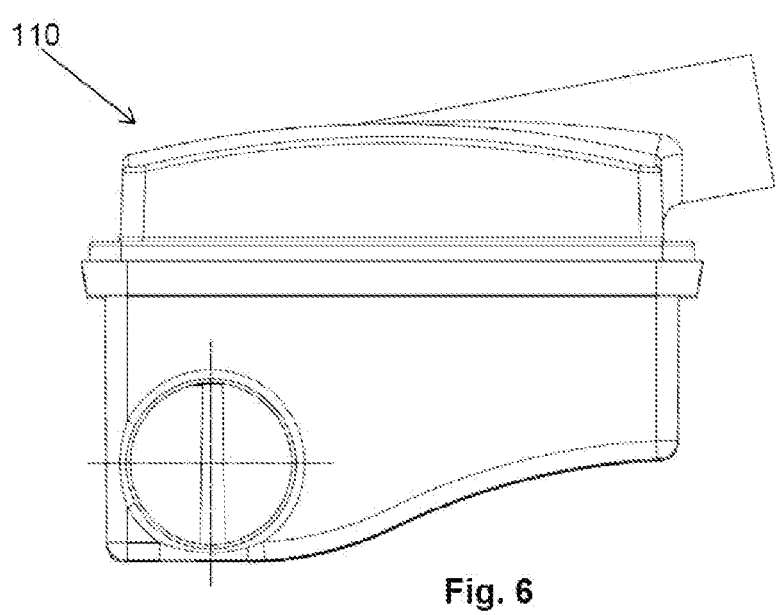
FIG. 6 shows a side view of the air filter according to the invention.

FIG. 6 shows the air filter 110 in a side view.

Figure 7:
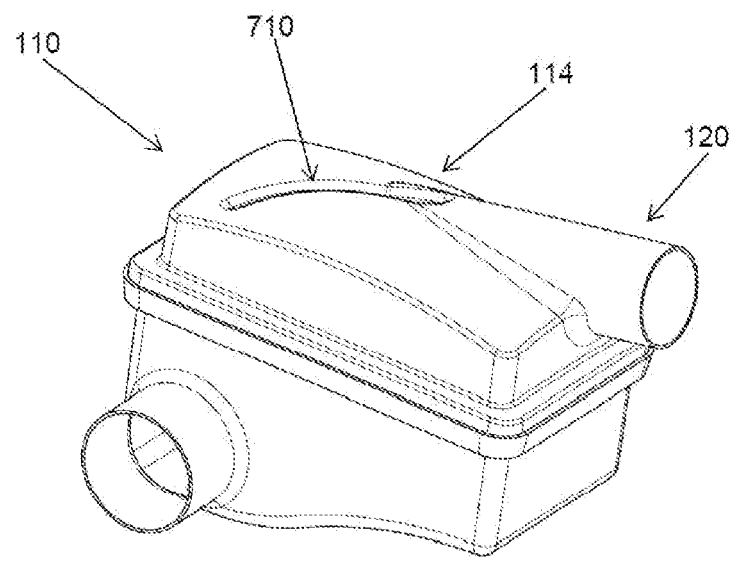
FIG. 7 is an isometric illustration of an air filter according to the invention in a second embodiment.

A second embodiment of the air filter 110 according to the invention is isometrically illustrated in FIG. 7. The air filter 110 comprises a second guiding rib 710 at the housing cover 114. This second guiding rib 710 is embodied in the form of an indentation of the housing cover 114. It extends at least in sections thereof above and parallel to a first guiding rib 212 (see FIG. 10). Moreover, it can be arranged with one end at the outlet 120.

Figure 8:
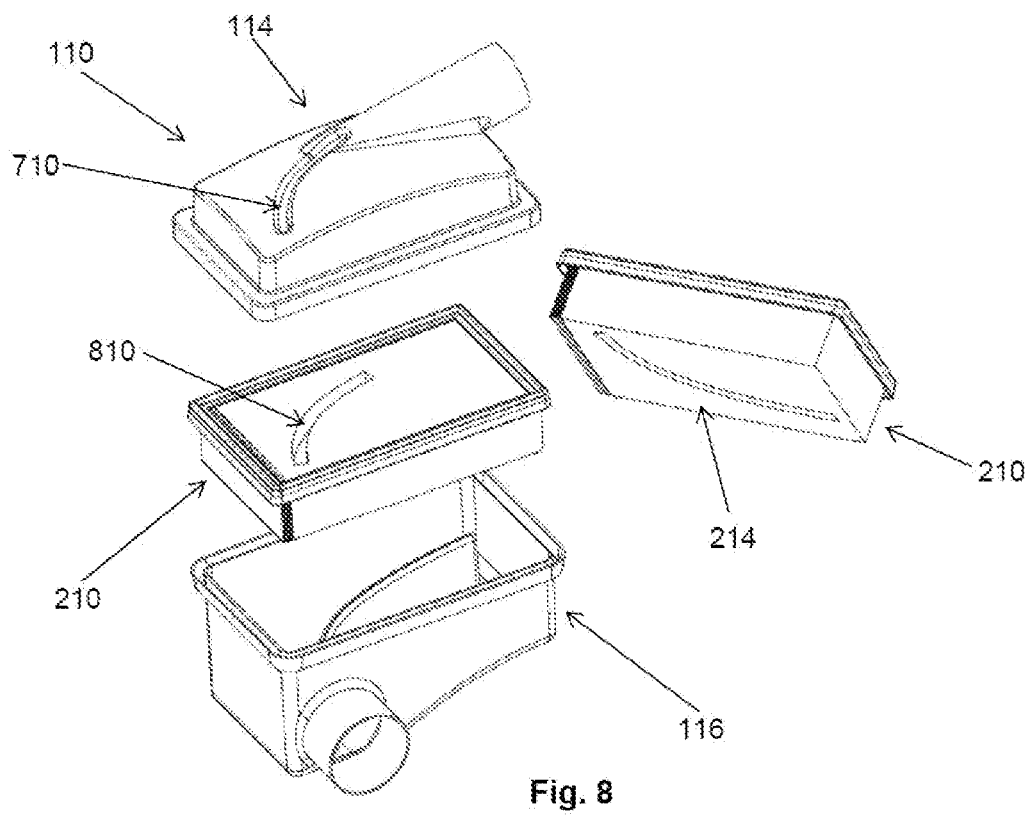
FIG. 8 shows the housing cover of the air filter, a filter element according to the invention in two different views, and a housing bottom of the air filter according to the invention in the second embodiment.

FIG. 8 shows separately, respectively, the housing bottom 116 and the housing cover 114 of the air filter 110 and the filter element 210 of the second embodiment. The filter element 210 comprises a filter medium 214. The filter medium 214 comprises an upwardly oriented second recess 810. The second guiding rib 710 can be inserted, in particular at least partially, into this second recess 810 with form fit when the filter element 210 is placed on the housing bottom 116.

Figure 9:
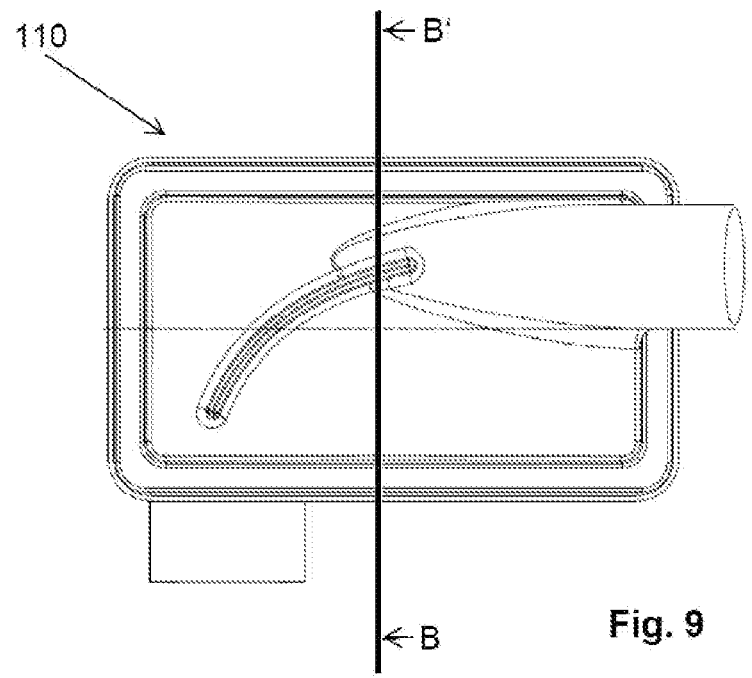
FIG. 9 is a plan view of the air filter according to the invention in the second embodiment.

FIG. 9 shows a plan view of the second embodiment of the air filter 110.

Figure 10:
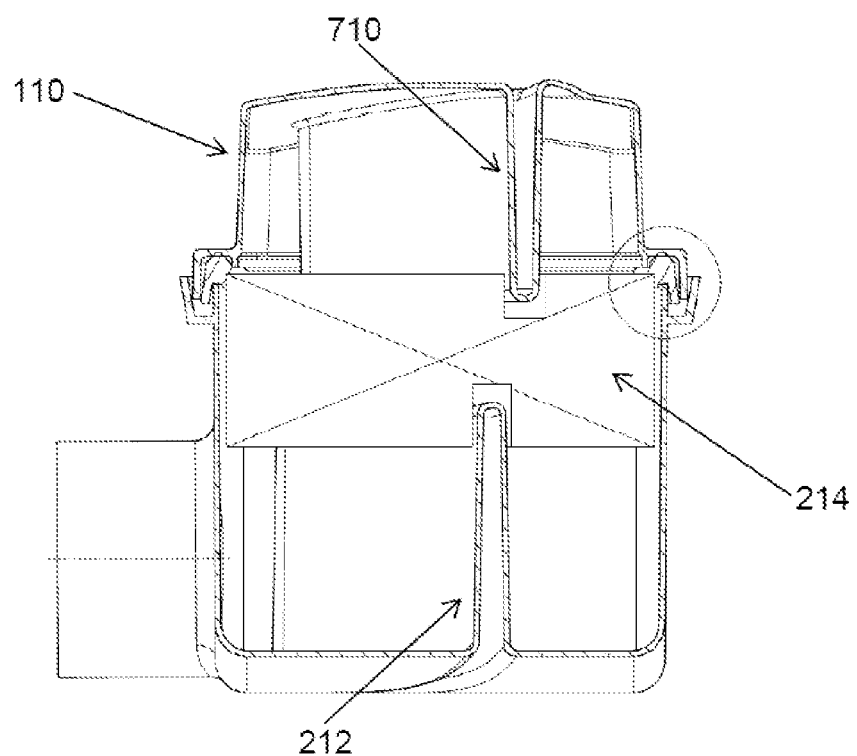
FIG. 10 is a cross section of the air filter according to the invention in the second embodiment.

FIG. 10 shows a cross section of the second embodiment of the air filter 110 along the line BB=in FIG. 9. The second guiding rib 710 is arranged above the first guiding rib 212 and with a horizontal displacement relative to this guiding rib 212. Moreover, the second guiding rib 710, in particular at least partially with form fit, is inserted into the filter medium 214. The filter medium 214 is arranged along both faces of and below the guiding rib 710.

Figure 11:
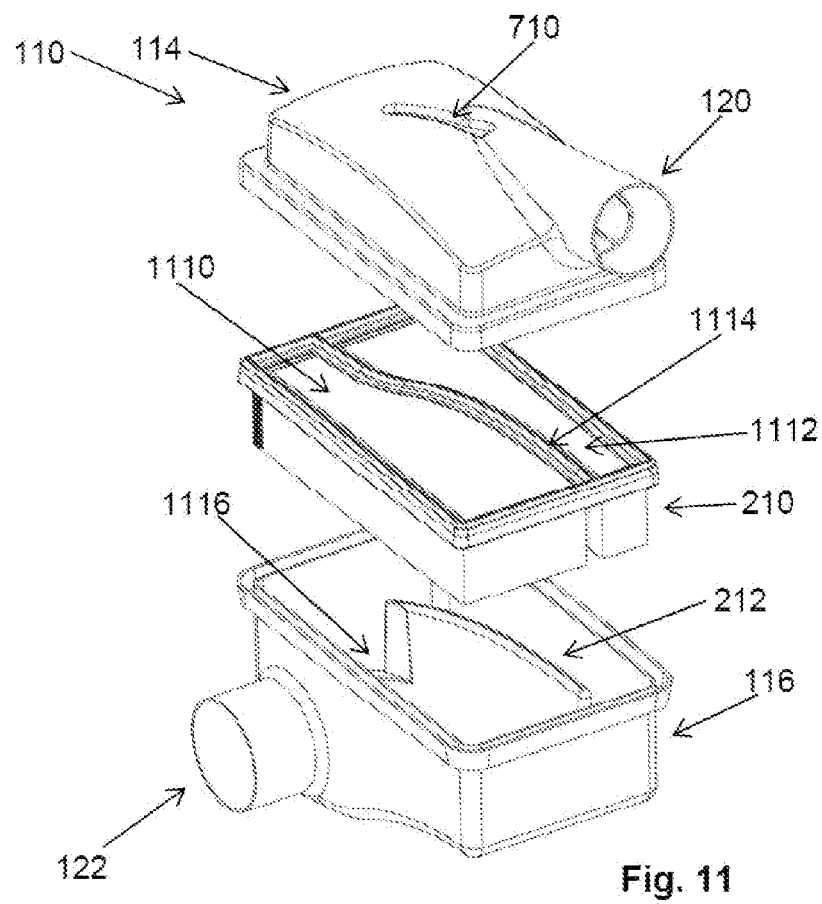
FIG. 11 shows the housing cover of an air filter according to the invention, a filter element according to the invention, and a housing bottom of the air filter in a third embodiment.

FIG. 11 shows separately, respectively, the housing bottom 116 and the housing cover 114 of the air filter 110 and the filter element 210 in a third embodiment. The air filter 110 comprises again a second guiding rib 710 at the housing cover 114. This second guiding rib 710 is embodied in the form of an indentation at the housing cover 114. It extends above and at least in sections thereof parallel to the first guiding rib 212. Moreover, it is preferably arranged with one end at the outlet 120. The filter element 210 comprises a first filter medium body 1110 and a second filter medium body 1112. The guiding rib 212 comprises a cutout 1116 in a section at its end arranged at the inlet 122. A sealing strip 1114 is seal-tightly arranged between the first filter medium body 1110 and the second filter medium body 1112. The sealing strip 1114 extend at least in sections thereof parallel to the guiding rib 212 and to the second guiding rib 710.

Figure 12:
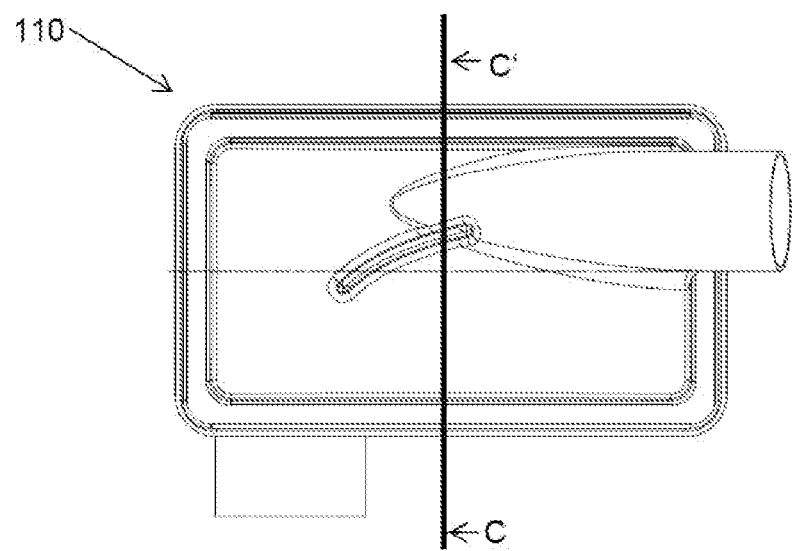
FIG. 12 shows a plan view of the air filter according to the invention in the third embodiment.

FIG. 12 shows a plan view of the third embodiment of the air filter 110.

Figure 13:
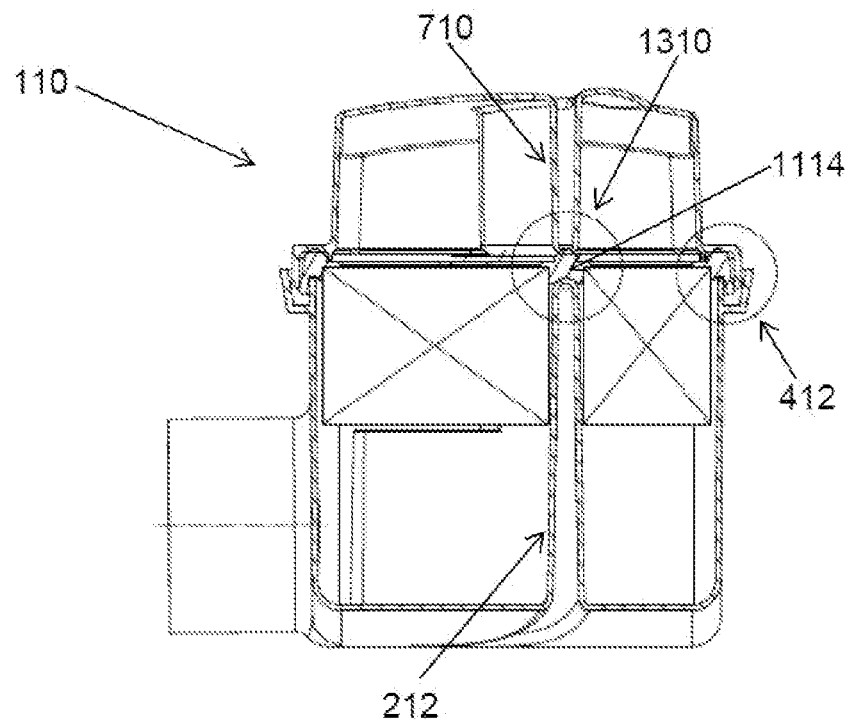
FIG. 13 is a cross section of the air filter according to the invention in the third embodiment.

FIG. 13 shows a cross section of the third embodiment of the air filter 110 along the line CC=in FIG. 9. In a contact region 1310, the second guiding rib 710 is air-tightly arranged at the sealing strip 1114. In this contact region 1310, the first guiding rib 212 is moreover arranged seal-tightly at the sealing strip 1114.

Figure 14:
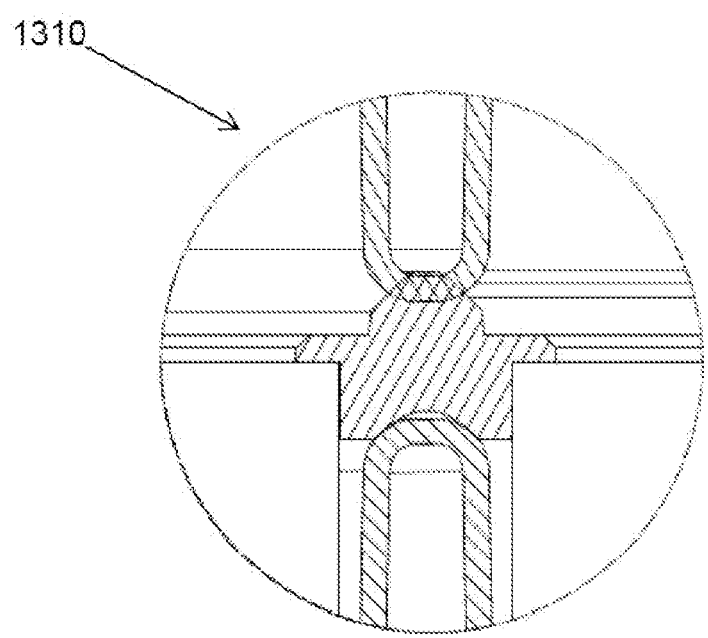
FIG. 14 is a contact region between two guiding ribs and a sealing strip in cross section in the air filter in the third embodiment.

In FIG. 14, the contact region 1310 is illustrated enlarged.

Figure 15:
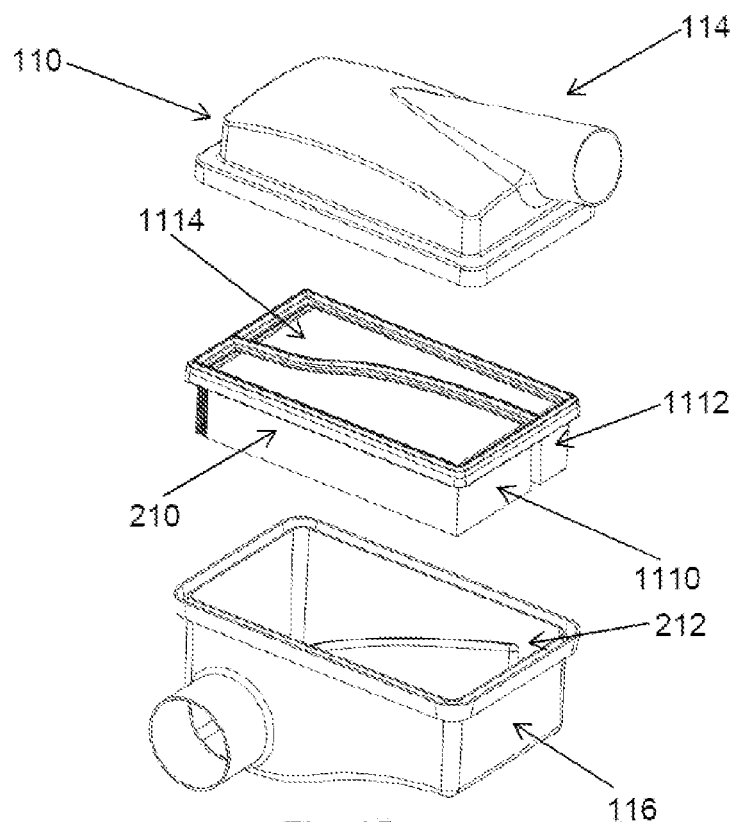
FIG. 15 is a housing cover of an air filter according to the invention, a filter element according to the invention, and a housing bottom of the air filter according to the invention in a fourth embodiment.

FIG. 15 shows separately, respectively, the housing bottom 116 and the housing cover 114 of the air filter 110 and the filter element 210 in a fourth embodiment. The filter element 210 comprises again a first filter medium body 1110 and a second filter medium body 1112. A sealing strip 1114 is air-tightly arranged between the first filter medium body 1110 and the second filter medium body 1112. The sealing strip 1114 extends above and in sections thereof parallel to the guiding rib 212.

Figure 16:
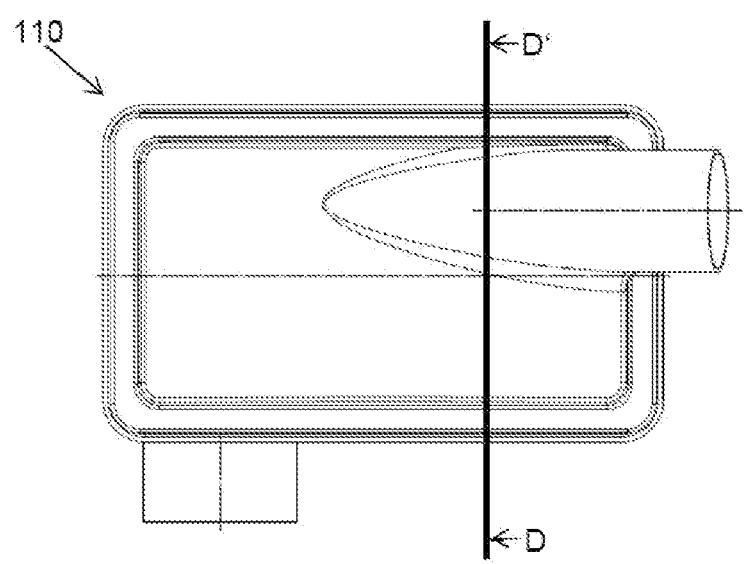
FIG. 16 is a plan view of the air filter in the fourth embodiment.

FIG. 16 shows a plan view of the fourth embodiment of the air filter 110.

Figure 17:
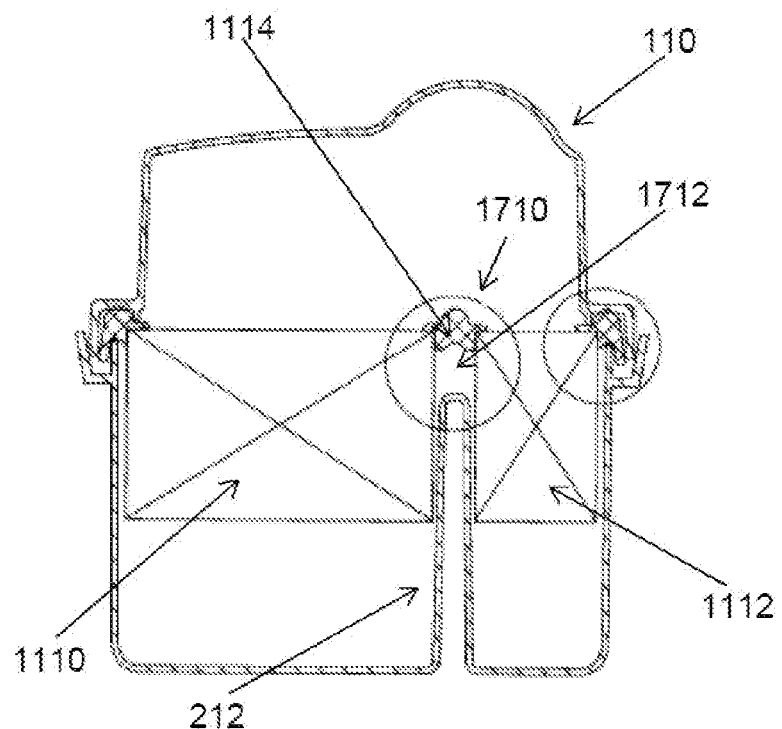
FIG. 17 shows a cross section of the air filter in the fourth embodiment.

FIG. 17 shows a cross section of the fourth embodiment of the air filter 110 along the line DD=in FIG. 16. In a separation region 1710, a slot-shaped cavity 1712 is formed between the sealing strip 1114 and the first guiding rib 212. The first filter medium body 1110 and the second filter medium body 1112 are arranged along one side of the guiding rib 212, of the opening 1712, and of the sealing strip 1114, respectively. Both sides of the opening 1712 are covered in this context completely by a respective filter medium body 1110, 1112. The first filter medium body 1110 and the second filter medium body 1112 are arranged air-tightly at the sealing strip 1114.

Figure 18:
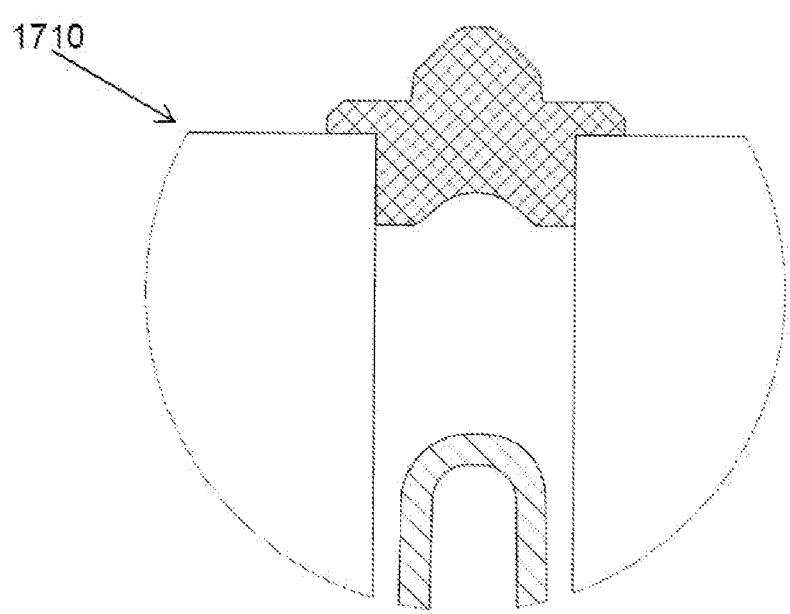
FIG. 18 shows a separating region between a guiding rib and a sealing strip in cross section in the air filter in the fourth embodiment.

FIG. 18 shows the separation region 1710 in an enlarged detail view.

In operation, the contaminated air is sucked through the inlet 122 (see FIG. 2) of the air filter into the chamber 222. It impacts on the guiding rib 212 in the chamber 222. This happens in a section 226 which is arranged along an extension of the longitudinal axis 310 (see FIG. 3) of the inlet 122. Subsequently, the air flow is guided along the guiding rib 212 and is thus guided through the filter medium 214, respectively, the first filter medium body 1110. Subsequently, the filtered air flows to the end 228 of the guiding rib 212 arranged at the outlet 120 from where it is supplied to the outlet 120 and exits from the chamber 222.

Figure 19:
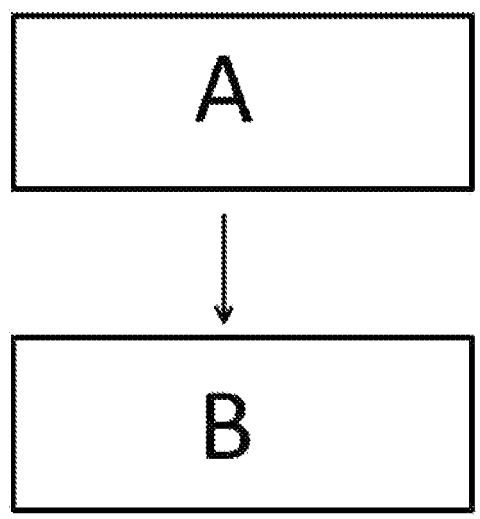
FIG. 19 shows schematically a method for producing a filter element.

FIG. 19 shows a method for producing a filter element 210 as described above. In a method step A, a filter bellows 224 is provided. In the method step B, a first recess 216, in particular a second recess 810, is formed. The method step B is preferably carried out by a computer-assisted sawing, milling and/or jet/beam cutting method.

When looking at all Figures of the drawing together, the invention concerns in summary a filter element 210 with optimized flow control. Moreover, the invention concerns an air filter 110 with a housing 112. In the housing 112, the filter element 210 according to the invention is or can be arranged completely or partially. The filter element 210 according to the invention for an air filter 110 comprises a filter bellows 224 with a filter medium 214 that is folded multiple times. In the filter bellows 224, a recess 216 for receiving a first guiding rib 212 of the air filter 110 is arranged. In this context, the recess 216 is curved at least in sections thereof along its length extension. The invention concerns also a method for producing a filter element 210 according to the invention.

What is claimed is:

1. A filter element configured for an air filter assembly having optimized air flow control, the filter element comprising:
   a filter bellows comprising a filter medium folded multiple times;
   a recess is formed into the filter medium such that the recess extends across multiple adjacent folds of the folded filter medium in the filter bellows, the recess configured to receive and engage an air flow guiding rib of a filter housing to guide air flow when installed into the filter housing;
   wherein the recess is curved at least in sections thereof along a length extension of the recess.

2. The filter element according to claim 1, wherein the filter bellows of the filter element comprises two side faces,
   wherein the recess extends continuously in the multiple adjacent folds of the folded filter medium between the two side faces of the filter element.

3. The filter element according to claim 1, wherein the recess completely divides the folded filter medium of the filter bellows into at least two filter medium bodies,
   wherein the filter medium bodies are connected with each other.

4. The filter element according to claim 3, further comprising
   at least one sealing strip,
   wherein the filter medium bodies are connected with each other by the at least one sealing strip.

5. The filter element according to claim 1, wherein the filter element has a plurality of outer side faces;
   wherein the outer side faces give the filter element a parallelepipedal shape.

6. An air filter comprising:
   a housing enclosing a chamber therein;
   a first air flow guiding rib formed on the housing and projected into the chamber;
   a filter element comprising
      a filter bellows comprising a filter medium folded multiple times;
      a first recess formed into the filter medium such that the first recess extends across multiple adjacent folds of the folded filter medium in the filter bellows, the first recess receiving and engaging the air flow guiding rib of the housing to guide air flow, the air flow guiding ribs dividing the air flow into adjacent air flow streams in the chamber of the housing;
      wherein the first recess is curved at least in sections thereof along a length extension of the first recess;
   wherein the filter element is arranged at least partially in the chamber of the housing; and
   wherein the first air flow guiding rib is immersed at least partially in the first recess of the filter element.

7. The air filter according to claim 6, wherein the housing comprises
   a second guiding rib formed on the housing and positioned at an opposite side of the filter bellows relative to the first guiding rib.

8. The air filter according to claim 7, wherein
   a second recess is formed into the filter medium such that the recess extends across multiple adjacent folds of the folded filter medium in the filter bellows at the opposite side of the filter bellows, the second guiding rib is immersed in the second recess of the filter element.

9. A method for producing a filter element according to claim 1, wherein the method comprises:
   providing the filter bellows of the folded filter medium;
   forming the recess into the filter medium such that the recess extends across multiple adjacent folds of the folded filter medium in the filter bellows with a computer-assisted separation method,
   wherein the separation method forms the recess to be curved at least in sections thereof.

10. The method according to claim 9, wherein the computer-assisted separation method is a computer-assisted jet/beam cutting method.

* * * * *